United States Patent [19]

Peterson et al.

[11] Patent Number: 5,485,895
[45] Date of Patent: Jan. 23, 1996

[54] MULTI-PHASE LUBRICANT PROCESS FOR LUBRICATING WITH MULTI-PHASE LUBRICANTS

[75] Inventors: Brian K. Peterson, Yardley, Pa.; Andrew Jackson, Pennington, N.J.

[73] Assignee: Mobil Oil Corporation, Fairfax, Va.

[21] Appl. No.: 319,766

[22] Filed: Oct. 7, 1994

[51] Int. Cl.$^6$ .................................................. F01M 5/00
[52] U.S. Cl. ........................... 184/6.22; 184/6; 184/6.21; 184/104.1
[58] Field of Search ................................ 184/6.21, 6.22, 184/6, 104.1; 252/52 A

[56] References Cited

U.S. PATENT DOCUMENTS

| | | | |
|---|---|---|---|
| 3,042,147 | 7/1962 | Hutchings | 184/6.22 |
| 3,931,102 | 1/1976 | Lundberg | 252/32.5 |
| 3,966,625 | 6/1976 | Tanizaki et al. | 252/52 A |
| 4,239,638 | 12/1980 | Beretta et al. | 252/73 |
| 4,370,247 | 1/1983 | Ostyn | 252/46.7 |
| 4,732,706 | 3/1988 | Borduz et al. | 252/510 |
| 4,909,951 | 3/1990 | Mendelson et al. | 252/17 |
| 5,169,564 | 12/1992 | Gallacher et al. | 252/400.52 |

FOREIGN PATENT DOCUMENTS

| | | | |
|---|---|---|---|
| 2205931 | 5/1974 | France . | |
| 0291804 | 7/1991 | Germany | 184/6.22 |
| 1041718 | 9/1983 | U.S.S.R. | 184/6.22 |
| WO90/13620 | 11/1990 | WIPO . | |

OTHER PUBLICATIONS

N. Drenchev and Y. Ruseva, vol. XVII, 1970, pp. 9–17.
Chemical Abstracts 112:P101945.

*Primary Examiner*—Thomas E. Denion
*Attorney, Agent, or Firm*—Alexander J. McKillop; Malcolm D. Keen; Jessica M. Sinnott

[57] ABSTRACT

An apparatus for lubricating an operating component of a system in which the operating component is exposed to a range of conditions, such as a range of temperatures, which require adjustment of at least one physical property of the lubricant is described. In one embodiment, at least a portion of the operating component is located within a lubricant reservoir which contains a first lubricant of low density and high viscosity and a second lubricant of higher density and lower viscosity. During certain operating conditions, the lubricants are at least partially immiscible, usually at lower temperatures, and the first lubricant is appropriate for those operating conditions. A change in at least one operating condition which promotes at least partial miscibility of the lubricants, such as higher temperatures, causes the first and second lubricants to mix, at least partially, and form a third lubricant. The third lubricant has at least one property which differs from that of the first and second lubricants, usually a different viscosity. The third lubricant contacts the operating component and is more appropriate for lubricating under the condition which causes at least partial miscibility. In an alternative embodiment the operating component is not located within the lubricant reservoir and the lubricant is conveyed to the operating component. Processes for lubricating are also described.

23 Claims, 5 Drawing Sheets

MULTI-PHASE LUBRICANT PROCESS FOR LUBRICATING WITH MULTI-PHASE LUBRICANTS

FIELD OF THE INVENTION

This invention relates to a multi-phase lubricant, an apparatus for lubricating with a multi-phase lubricant and a process for making a multi-phase lubricant.

BACKGROUND OF THE INVENTION

Lubricants for industrial and automotive uses are, usually, single phase, constant composition materials made of basestocks to which various performance enhancing additives may be incorporated. Typically, a lubricant is selected to optimize the performance, function and protection of lubricated systems such as gears, cam-follower pairs, roller bearings, hydrodynamic bearings or pumps.

To optimize system performance, the lubricant is formulated by selecting one or more basestocks and additives which will meet system needs when combined. Viscosity properties are an important consideration when formulating a lubricant because the appropriate viscosity balances energy loss because of viscous drag with wear because of diminished oil film thickness. Antiwear and antiscuff additives can help protect surfaces when the oil film between them thins. Basestocks, depending on their composition, can have various beneficial properties such as antioxidancy, good viscosity index and low traction.

While it is possible to optimize lubricant selection for a single phase lubricant, optimum performance under the prevailing operating conditions (such as speed, load and temperature) can be compromised when the conditions change or when the same lubricant is used to lubricate several parts, each part having its own unique lubricant needs. Frequently, one lubricant is used to lubricate a wide variety of machines, for the sake of simplicity.

The use of a single phase lubricant requires a compromise between premature machine failure due to wear, fatigue or scuffing, because the lubricant is of insufficient viscosity under certain operating conditions, with excessive energy loss or overheating, because the lubricant viscosity is too high for other operating conditions. Since machine or plant operators prefer to minimize downtime, the compromise usually favors high viscosity lubricants which reduce equipment failure but cause excess energy loss. Additionally, where temperatures vary widely, the viscosity selected may be for the weakest link component at its highest operating temperature but because of the relationship between viscosity and temperature, much energy is wasted since the lubricant viscosity is too high under the normally lower operating temperatures.

A two-phase lubricant for improving the low temperature starting of an automobile engine is disclosed in French Patent No. 2,205,931. There, a process is disclosed in which a more dense lower viscosity phase and a less dense higher viscosity phase are combined such that a homogeneous phase, with lubricating properties characteristic of conventional engine lubricants, exists when the engine is at its operating temperature. When the engine is cool, the phases separate so that on starting the engine under low temperature conditions only the low viscosity more dense fluid is drawn into the oil pump. This improves engine cranking speeds because of reduced viscous drag and provides easier starting. The disclosed lubricants are hydrocarbons and esters, the heavier ester phase has the lower viscosity. The objective of the patent is to ease cold starting of an automobile engine. The patent describes the disadvantages associated with polymers as viscosity index enhancers because they degrade with use and cause the oil to lose viscosity. Thus, the patent suggests the use of the two-component system as an alternative to polymers because it provides good low temperature starting without viscosity degradation over time. The lubricant phases mix as the engine warms-up and the mixed lubricant behaves in the conventional manner, demonstrating large viscosity variations with temperature.

The moving parts of industrial machines are often actuated by liquid, usually oil, sometimes water-based emulsions, that is under pressure. The system used to apply the liquid is a hydraulic system, usually a contained system, which includes a reservoir, a motor driven pump, control valves, a fluid motor and piping which connects these components. Lubricating oil is often selected because it is useful for pressure transmission and controlled wear and it minimizes friction and wear of moving parts and inhibits corrosion. Hydraulic fluids with low pour points and high viscosity indexes (VI) are formulated for use in mobile and marine applications that are subject to temperature extremes during service. With these high VI fluids, the goal is to obtain effective and consistent hydraulic actuation under extremes of high and low temperatures. Although there are many high VI hydraulic fluids available which attempt to meet this objective, it is very difficult to do with one fluid phase that has fairly constant properties.

SUMMARY OF THE INVENTION

The invention is directed to a process for lubricating a component of a system which is exposed to a range of operating conditions.

More specifically, the invention is directed to a process for lubricating a plurality of components in which each component is exposed to a range of operating conditions. In the process of this invention, the component is lubricated with a first lubricant whose viscosity properties are changed as at least one condition of operation changes. For example, as the temperature of operation increases, the viscosity of the first lubricant is increased by the addition of a second lubricant with which it is at least partially miscible. As the temperature of the operation decreases, the lubricant viscosity requirements can be easily and instantly modified. That is, the proportion of second lubricant is reduced by separation and removal or by reducing the amount added to the first lubricant.

The invention is further directed to a closed hydraulic system in which a first hydraulic fluid has its properties modified by the addition of a second hydraulic fluid in which it is at least partially miscible under the conditions which require the first hydraulic fluid to be modified. In this embodiment of the invention, effective hydraulic actuation can be achieved with the same closed system under extremes of conditions, typically high and low temperatures, which are usually encountered during marine and mobile service.

In this respect, the invention is also directed to a process for moving at least one part of a system by circulating a hydraulic fluid.

The invention is directed to a process for lubricating an operating component of a system in which the component is exposed to a range of operating conditions, the process comprising:

(a) maintaining a first lubricant and a second lubricant in at least a partial immiscibility zone under a condition sufficient for at least partial immiscibility of the first and second lubricant, the second lubricant is miscible with the first lubricant under a condition suitable for miscibility and under the miscibility condition the second lubricant changes the physical properties of the first lubricant;

(b) detecting the operating condition of the component;

(c) feeding an amount of the first lubricant and an amount of the second lubricant to a mixing zone which is dedicated to the operating component, the relative proportion of each lubricant dispensed to the mixing zone being dependent upon the proportion required to achieve a third lubricant having a property suitable for lubricating under the operating condition detected in step (b);

(d) generating, in the mixing zone, a condition sufficient for miscibility of the first and second lubricant to produce the third lubricant;

(e) applying the third lubricant to the component; and (f) removing at least a portion of the third lubricant from the component.

The process further comprises the step of at least partially separating the first lubricant from the second lubricant by subjecting the third lubricant to a condition which makes the first lubricant at least partially immiscible with the second lubricant.

The invention is further directed to an apparatus for lubricating an operating component of a system in which the operating component is exposed to a range of operating conditions which require adjustment of at least one physical property of a lubricant which lubricates the component during its operation, comprising:

(a) a first lubricant reservoir for containing a first lubricant;

(b) a second lubricant reservoir for containing a second lubricant having at least one property which is different from a property of the first lubricant;

(c) a dispenser which is operatively connected to the first and the second lubricant reservoirs, the dispenser for supplying an amount of the first lubricant and/or the second lubricant from the first and/or the second lubricant reservoir to a mixing zone, the dispenser for controlling the relative proportion of the first lubricant and the second lubricant dispensed to the mixing zone, the mixing zone being suitable for mixing the first lubricant and the second lubricant to produce a third lubricant, and the mixing zone being positioned to supply the third lubricant to the operating component;

(d) a condition sensor which detects a change in the operating condition of the component during its operation; and (e) an actuator which is in communication with the dispenser and which is responsive to the condition sensor, the actuator activates the dispenser to change the relative proportion of the first lubricant and the second lubricant dispensed to the mixing zone in response to a change in the operating condition which requires adjustment of at least one physical property of the third lubricant.

In a further embodiment of the invention, the invention is directed to a lubricant composition for a system requiring lubrication during operation, comprising:

(a) a hydrocarbon lubricant; and (b) a polyalkylene glycol lubricant of higher density and higher viscosity than the hydrocarbon lubricant which influences the viscosity of the hydrocarbon lubricant under a condition which is sufficient to make the hydrocarbon lubricant and the polyalkylene glycol lubricant at least partially miscible.

In a still further embodiment, the invention is directed to an apparatus for lubricating an operating component of a system in which the operating component is exposed to a variation in a condition of operation which requires adjusting at least one physical property of the lubricant which lubricates the component during operation, comprising:

(a) a reservoir comprising a first lubricant of low density and low viscosity and a second lubricant of higher density and higher viscosity than the first lubricant, the second lubricant is immiscible with the first lubricant under an operating condition suitable for immiscibility;

(b) a third lubricant comprising at least a partial mixture of the first lubricant and the second lubricant which partial mixture forms within the reservoir under an operating condition suitable for at least partial miscibility of the first lubricant and the second lubricant;

(c) an operating component, at least a portion of the operating component being located within the reservoir and in contact with the first lubricant of low density and low viscosity, under a condition of immiscibility, and the operating component being in contact with the third lubricant under an operating condition suitable for at least partial miscibility of the first lubricant and the second lubricant.

Still further, the invention is directed to a process for lubricating an operating component of a system in which the operating component is exposed to a variation in a condition of operation, comprising:

(a) maintaining a first lubricant of low density and low viscosity and a second lubricant of higher density and higher viscosity than the first lubricant in a lubricating zone under an operating condition in which the first lubricant and the second lubricant are partially immiscible;

(b) contacting the operating component with the first lubricant under the operating condition of immiscibility; and (c) conducting the contacting of the operating component under an operating condition which is different from the operating condition of step (b) and which is suitable for at least partial miscibility of the first lubricant and the second lubricant which forms a third lubricant.

In yet another embodiment of the invention, the invention is directed to a closed hydraulic system in which hydraulic actuation is applied to move at least one part of a system by a circulating hydraulic fluid comprising (a) an at least partial immiscibility zone which contains a first hydraulic fluid and a second hydraulic fluid under a condition sufficient for at least partial immiscibility of the first and second hydraulic fluids, the second hydraulic fluid is at least partially miscible with the first hydraulic fluid under a condition suitable for at least partial miscibility and under this miscibility condition the second hydraulic fluid changes a physical property of the first hydraulic fluid;

(b) at least one hydraulic actuator for providing hydraulic force to the part of the system;

(c) a controller for driving the hydraulic actuator;

(d) a mixing zone associated with the at least partial immiscibility zone, the mixing zone for containing the first and second hydraulic fluids which are in a state of at least partial immiscibility when there is a condition for at least partial immiscibility; and (e) at least one pump for providing the first and second hydraulic fluids which are in a state of at least partial immiscibility from the mixing zone to the hydraulic actuator when a condition suitable for miscibility occurs.

The lubricants are, typically, at least partially miscible. Although the lubricants can be totally miscible, this can be difficult to achieve. Therefore, in specific terms, the lubricants are substantially miscible.

DETAILED DESCRIPTION OF THE INVENTION

Figure 1:
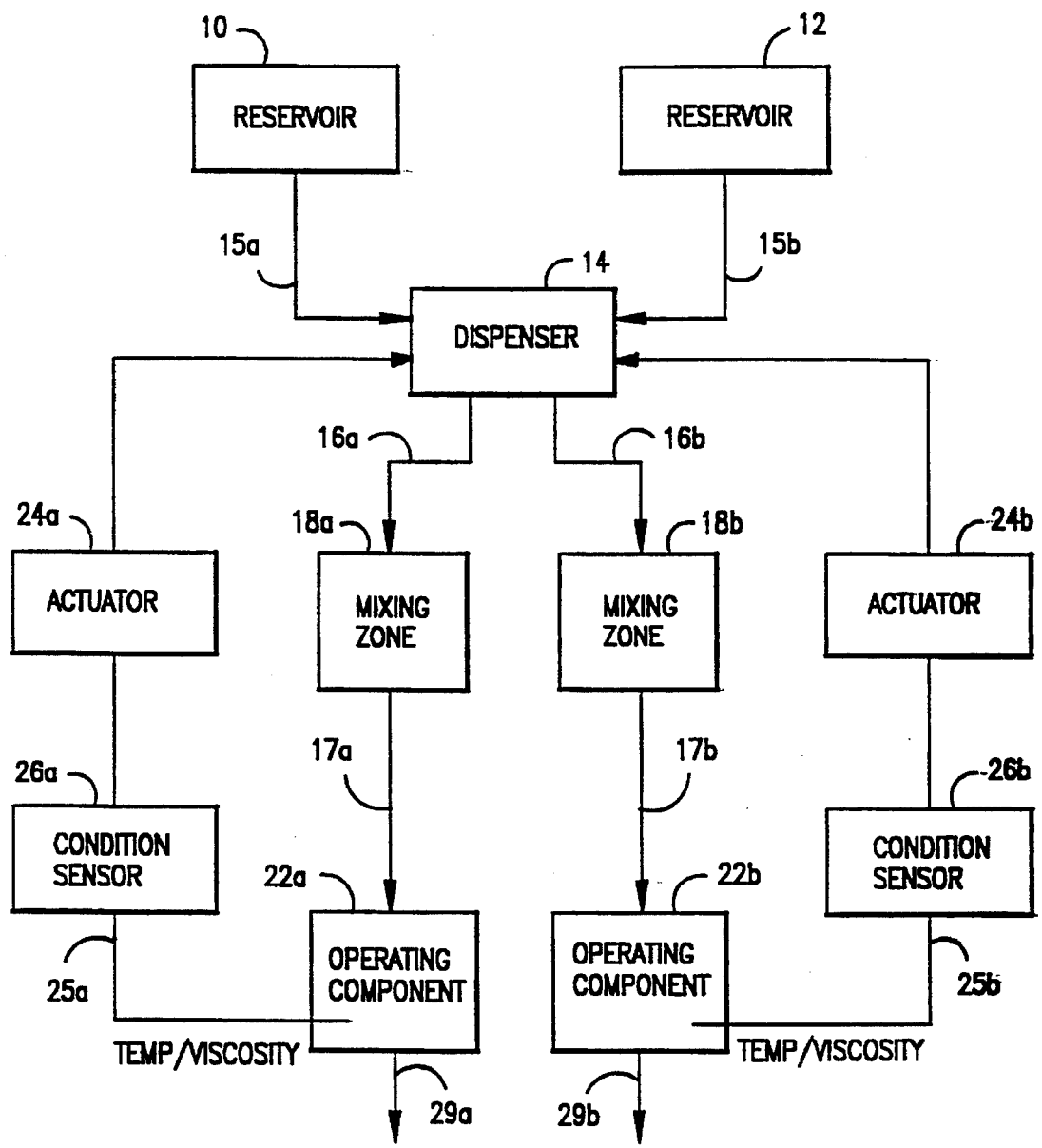
FIG. 1 is a simplified schematic flow diagram of the process of this invention.

In one embodiment of the invention, there are at least two different phases of lubricant. The term "different phase" is used here to mean a physical difference between the lubricants which makes them separable under a certain condition. Typically, the first phase lubricant is a low viscosity material and the second phase lubricant is a high viscosity material. The second lubricant can be referred to as a contributor in that its combination with the first lubricant contributes certain properties, such as a different viscosity, which will modify the first phase lubricant thereby producing a third lubricant. Typically, a density difference between the two phases allow easy separation to occur under conditions which cause the phases to be immiscible.

Typical lubricants which can be used in the invention are miscible in any proportion at temperatures ranging from above about 20° C. to about 100° C., depending upon the application. However, the proportion of each lubricant can influence miscibility, depending upon the characteristics of the lubricant. Typically, as the viscosity difference between the lubricants increases their miscibility decreases and reduced amounts of the more viscous material and/or more severe mixing conditions, may be required to maintain miscibility of the lubricants.

Although, typically the second phase is a liquid, it can also be a solid or gas which dissolves into the first phase at certain operating conditions such as elevated temperatures and pressures. A specifically contemplated solid is a wax which would mix in with the lower viscosity first phase during high temperature operation to increase its viscosity. Alternatively, there can be an immiscible solid or liquid which contains a material that releases into the first phase in response to a changing operating condition, such as an increased temperature.

The density of one of the phases can be sufficiently higher than the density of the other phase to facilitate separation. Although difficult to quantify, a density difference of at least about 0.02 gm/cc and preferably at least about 0.08 gm/cc should be sufficient for separation by gravity.

The term miscible is used here to indicate when the phases are uniformly dispersed in each other. Ideally, when the phases of lubricant are subjected to a condition which makes them uniformly dispersed in each other, they form a single phase. However, to be useful, the lubricants need only be at least partially miscible, preferably substantially miscible.

The choice of materials employed for each phase will depend upon the conditions of the system and the optimum viscosity needed for the machine element to be lubricated.

The following are alternative embodiments showing various applications in which the lubricant system can be employed.

The invention has utility in lubricant circulation systems used on machines, such as a paper machines, printing presses or machine tools, which have many components each operating under different conditions (e.g. temperature). The invention also has utility in lubricant circulation systems used in multi-machine plants such as manufacturing or power generating facilities which have a number of machines operating under a wide variety of conditions.

The invention will be useful in gearboxes which operate over a range of temperatures and operating conditions, in particular, in multiple reduction gearboxes where the gear contacts for the various reductions have different lubricant needs.

The invention can also be used as a method for controlling fluid viscosity in hydraulic systems. These systems are found on off-highway equipment and on ships and are subjected to a variety of ambient temperatures under which they must perform. The invention alleviates the large changes in hydraulic fluid viscosity with temperature which compromise performance.

In closed hydraulic systems in which there is a circulating first hydraulic fluid, the invention is useful for modifying or controlling at least one property of the circulating first fluid. Either automatically upon a change in an operating condition or upon detecting a change in at least one operating condition such as an increase in temperature, a second hydraulic fluid which will change at least one property of the first hydraulic fluid when the two become miscible is mixed with the first fluid. Thus, in a typical system, the second hydraulic fluid will elevate the viscosity of the first hydraulic fluid when the operating temperatures increase to facilitate hydraulic operation under those reduced temperatures.

The hydraulic system of this invention will be useful when applied to machine tools, presses, draw benches, elevators, jacks and mining machinery. It will typically be useful for lifts used in the marine environment and on other mobile equipment which is exposed to the vast temperature fluctuations which may occur near molten metal, open flames and travel from cold climates (e.g. the arctic) to hot climates.

It is further contemplated that the invention will be useful in engines such as large diesel engines and aviation or stationary gas turbines where lubricant oil volumes or critical component needs may economically justify the addition of a phase separation and circulation system.

This invention can also be used for stability control of hydrodynamic bearings. The ability to control viscosity, as disclosed herein, can be used to bypass certain unstable operating conditions without the need to alter speed or load.

The invention can also minimize energy losses in circulation systems feeding hydrostatic bearings by optimizing the viscosity needed to support the bearing loads.

It is further contemplated that the invention will be useful for additive treatment of lubricants. In this regard, selective additive miscibility in one of the phases would allow additives to be delivered at the point of need. This will keep them away from parts which they may harm.

The invention will also allow for varying basestock properties such as traction force generation under shearing conditions. A high degree of traction force generation in certain types of components is desired to prevent slip. Yet, a low degree of this property is desired in other types of components to reduce friction losses and heat generation. With the multi-phase lubricant, the lubrication requirements of both types of components can be met without compromising either.

Implementation of the invention can be passive or active. A passive system is exemplified by a machine where the components, such as the gears, are lubricated by contact with the single phase lubricant. In one embodiment, the component is dipped into an upper layer of lubricant, the less dense phase, located within the sump. The higher density phase, located in a lower layer does not contact the component until the temperature of the machine increases sufficiently to cause increasing amounts of the high density lubricant to mix with the low density lubricant. In this embodiment, the high density lubricant is selected to have a high viscosity so that the mixed lubricant will more effectively lubricate under the high temperature conditions. As the temperature decreases, the lubricants will separate and the lower density material which is selected for its low viscosity will lubricate.

An active system utilizes a manual, mechanical or electromechanical control to determine the proportion of each lubricant necessary to achieve optimum lubricant properties. The lubricants are mixed and distributed to the component to be lubricated. After use, the lubricant is collected and brought to a separator for separating and reuse.

Because one aspect of this invention includes separating the multi-phase lubricant, after use, into phases rich in the starting lubricants which are then remixed and reused, it is important that each lubricant be sufficiently physically or chemically different so that they are at least partially immiscible under certain conditions.

Specifically contemplated methods of separating the lubricants include gravitational separation, e.g. in a holding tank, where the density difference is sufficient to allow separation by this method or by use of a centrifuge, hydrocyclone or other apparatus which enhances gravitational separation. Other separation systems can be used and those contemplated include membrane separation and solvent separation. Although not a preferred form of separation, distillation may also be employed.

FIG. 1 is a simplified schematic flow diagram of one embodiment of the invention. A first lubricant reservoir 10 contains a lubricant of a first viscosity. A second lubricant reservoir 12 contains a lubricant of a second viscosity. Each lubricant reservoir is associated with a dispenser 14. An example of a suitable dispenser is a pump typically a plurality of pumps. The lubricant from each lubricant reservoir is transferred to mixing zones 18a and 18b via the dispenser 17 through conduits 15a, 15b, 16a and 16b. The mixing zones 18a and 18b are associated with operating components 22a and 22b. In the drawing two operating components are shown to demonstrate that a plurality of operating components, each having distinct lubrication requirements, can be handled by this system. The dispenser has the ability to control the flow of lubricant from the reservoir to the mixing zone. Although, in the drawing, the operating component is separate from the mixing zone and connected through lines 17a and 17b, they can be more closely associated. That is, the mixing zone can be located about the operating component. For example, in a roller bearing, the mixing zone can be the zone of lubricant which lubricates the bearing. Condition sensors 26a and 26b are situated to detect a change in the operating condition of either or both components during their operation. The condition sensors can comprise a temperature measuring device 25a and 25b, such as a thermometer, or a viscometer. Thus, the detectable change can be in the operating temperature of the component or the viscosity or temperature of the lubricant which lubricates the component or any other measurable operating condition. The condition sensors provide information, concerning the operating condition, to actuators 24a and 24b which are in communication with the dispenser 14. In response to a change in an operating condition of either component 22a or 22b, detected by the condition sensor, the actuator activates the dispenser to adjust the proportion of the first and/or second lubricants dispensed to the mixing zone. In this manner, a property of the lubricant, such as viscosity, can be increased or decreased in response to an operating condition to which the component is exposed. Specific examples of operating components which will benefit from this device are a bearing, such as a ball or roller bearing or gears. In a specific example, the dispenser is a pair of pumps pressurizing lubricants from lines 15a and 15b and a series of valves individually controlling the proportions of the lubricants being sent to a multiplicity of components such as 22a and 22b via lines such as 16a and 16b. The individual settings on the valves can be determined through an algorithm determining the needs of the components based on inputs from operating condition sensors 24a and 24b. The third lubricant is withdrawn from the component via lines 29a and b. Optionally, the first lubricant is at least partially separated from the second lubricant under a condition sufficient to make them immiscible. Thereafter the lubricants can be reused by returning them to the lubricant reservoirs or discarded.

Figure 2:
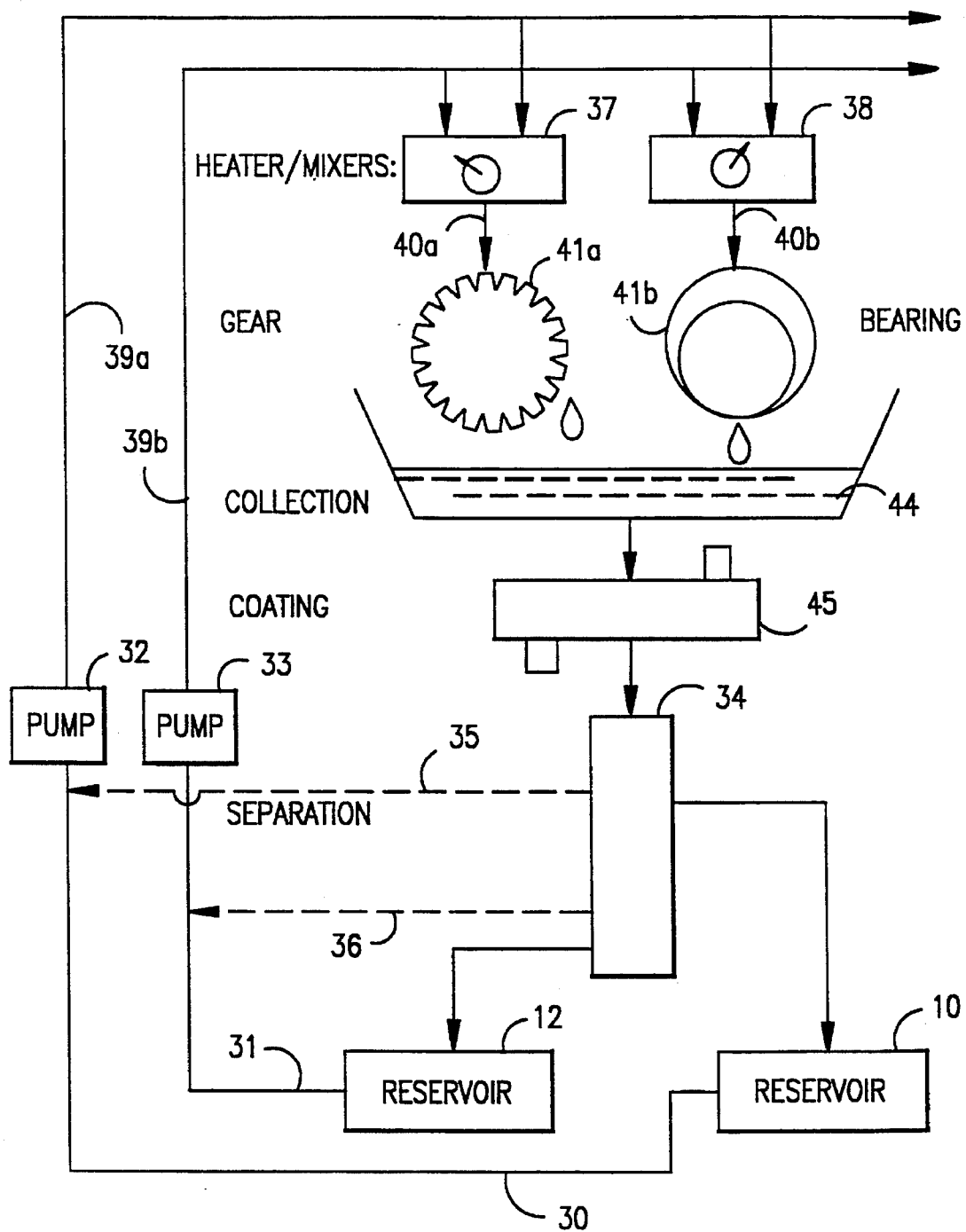
FIG. 2 is a simplified schematic drawing of an apparatus contemplated for carrying out this invention.

FIG. 2 is another simplified schematic flow diagram of one embodiment of the invention. In FIG. 2, there is shown a first lubricant reservoir 10 and a second lubricant reservoir 12 each containing a lubricant having a different density. An amount of lubricant is withdrawn from each reservoir via lines 30 and 31 each having a pump 32 and 33. Alternatively, each lubricant may be drawn from separation zone 34, the lower density lubricant withdrawn from the top of the zone via line 35 and the higher density lubricant withdrawn from the bottom of the zone via line 36. The lubricants are passed to at least one mixer zone, such as a first mixer zone 37 and a second mixer zone 38 via lines 39a and 39b. Each mixer zone is dedicated to a component or a set of components having similar lubrication needs. In the mixer zones, the first and second lubricants are combined in proportions determined to produce a single phase lubricant meeting the needs of the component(s) assigned to that mixing zone. This can be aided, if necessary, by heating and/or stirring. An example of how the proportions of each phase to be mixed in each mixing zone may be determined is through the use of a microprocessor or computer which receives feedback on the operating condition of the component such as temperature, speed and load and uses an algorithm designed to determine the viscosity needs of that component. Viscosity control may also be aided by in-line viscosity sensors in the supply lines of the individual phases or in the output line from the mixing zone to the component. Flow rates needed for cooling or for adequate lubrication can also be determined using a similar data processing method. The single or mixed phase lubricant flows from each mixer zone to its associated components such as a gear 41a or a bearing 41b via lines 40a and 40b. After performing its lubricating function, the lubricant flows back to a lubricant separator comprising at least one collection zone 44 and optionally, a cooling zone 45. The collected lubricant is then passed to the separation zone 34 which separates the first phase from the second phase. Each separated phase can be, optionally, filtered and, optionally, returned to its reservoir for re-use.

Figure 3:
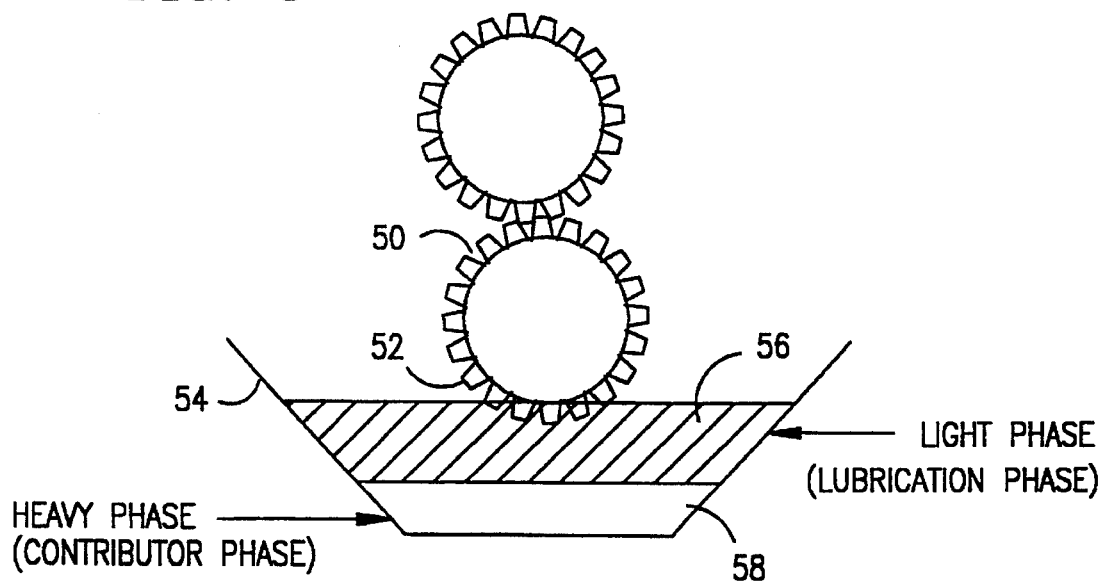
FIG. 3 is a simplified schematic drawing of an alternative apparatus for carrying out the invention.

FIG. 3 is a further embodiment of the invention. In FIG 3, there is at least one operating component which requires lubrication for effective performance, such as a gear 50. The operating component is exposed to a variety of conditions during operation, e.g., high and low temperatures, which require adjusting at least one physical property of the lubricant. At least a portion of the operating component, e.g. the gear teeth 52, in the case of a gear, are located within a lubricant reservoir 54. The lubricant reservoir comprises a first lubricant of low density and, usually, of low viscosity 56 and a second lubricant 58 of higher density and, usually, higher viscosity than the first lubricant. The first and second lubricants are immiscible during certain operating conditions, usually at lower temperatures, e.g. ambient temperatures. Under operating conditions which promote miscibility of the lubricants, such as higher temperatures, the first and second lubricants mix, at least partially. When this occurs, a third lubricant forms having a property which is different from the first or the second lubricant. Usually, it has a different viscosity. This third lubricant comes into contact with the operating component and is more appropriate for lubricating the component under the condition which causes the mixing than either the first lubricant or the second lubricant. The used lubricant can be drained back into the reservoir for re-use.

Figure 4:
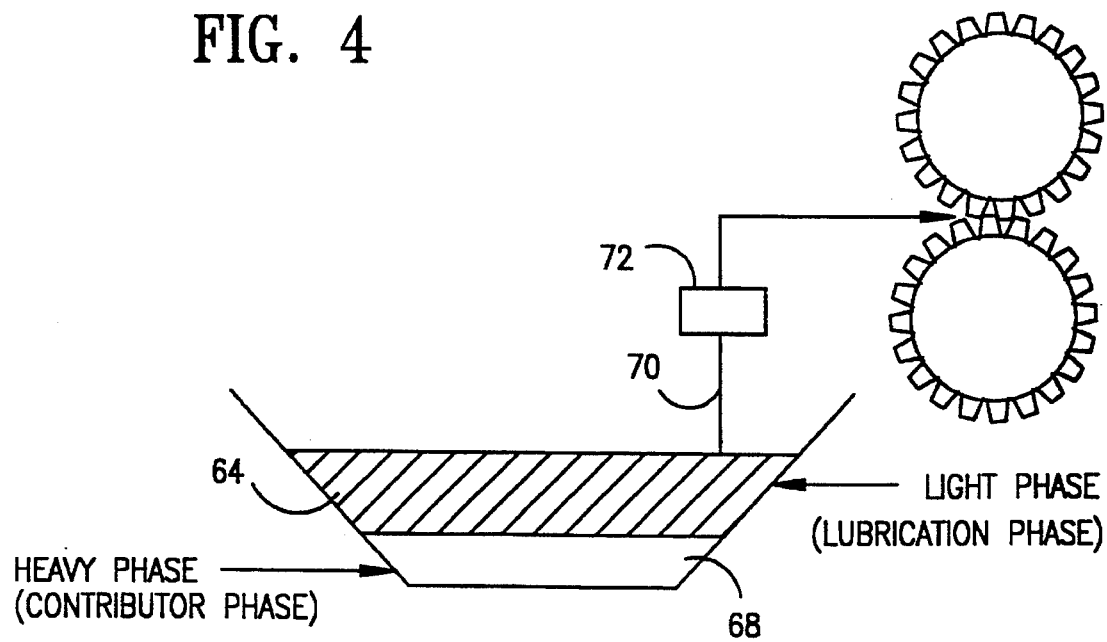
FIG. 4 is an alternative embodiment of the apparatus shown in FIG. 3.

In FIG. 4 an alternative apparatus is shown. In FIG. 4 the operating component or set of gears are located outside of the lubricant reservoir 64 and the lubricant is drawn from the top of the reservoir and transmitted to the gears 62 via line 70. A low density, usually low viscosity, lubricant is a first lubricant 66 and a second lubricant of higher density, and usually higher viscosity, is located below it in the bottom portion of the reservoir. The first lubricant is withdrawn from the top of the reservoir and transmitted to the gear via a pump or siphon under operating conditions which cause the lubricants to be immiscible. When the operating conditions change, causing the lubricants to be miscible, e.g., when operating temperatures increase, the lubricants mix. When this occurs, a third lubricant forms. The third lubricant has a property which is appropriate for lubricating the component under the changed operating condition. The used lubricant can be removed from the component and transferred back to the reservoir (not shown).

In both FIG. 3 and FIG. 4, the third lubricant will separate into the first and second lubricant when an operating condition which promotes immiscibility occurs, e.g., when the operating temperature drops.

In a more specific embodiment of the invention, a lubricant phase employed is a polyoxyalkylene compound, specifically a polyoxyalkylene liquid lubricant. Polyoxyalkylenes are described in Gunderson and Hart, *Synthetic Lubricants* (1962) at pages 61–101 which is incorporated herein by reference as to the description of the polyoxyalkylenes. The polyoxyalkylenes are essentially linear polymers which can be broadly defined by the structure:

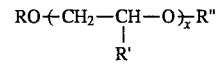

where R, R' and R" can each be hydrogen or one or two of R, R' and R" can be hydrogen while the other R, R' or R" is a lower alkyl group containing from 1 to 10 carbon atoms or 2 to 10 carbon atoms and an oxygen atom and x is an integer. The contemplated polyoxyalkylenes are diols, triols, monoethers, diethers, ether-esters or diesters. Preferred polyoxyalkylenes are polypropylene glycols.

The synthesis of polyoxyalkylene glycol diols and monoethers is, typically, by the addition of alkylene oxide to a hydroxyl group. Sources of the hydroxyl group can be water or glycol, which will produce a diol, alcohol which will produce a monoether or glycerine which will produce a triol. Diesters are usually prepared from either diols or monoethers and esters are usually prepared by esterification of the corresponding hydroxy compound.

The contemplated polyalkylene glycols are water insoluble, for purposes of miscibility with water insoluble hydrocarbon oils. However, water soluble polyalkylene glycols may be employed when they are at least partially miscible with other lubricants employed.

Specific examples of polyalkylene glycol lubricating fluids contemplated include polyethylene glycol, polypropylene glycol, polybutylene glycol, triols of polypropylene glycol, triols of mixed polyoxyalkylene glycol, monoethers of polypropylene glycol, monoethers of mixed polyoxyalkylene glycol and diethers of polypropylene glycol.

Usually the polyalkylene glycol will have a viscosity at 100° C. ranging from about 3 cSt. to about 1,000 cSt., specifically, from about 5 cSt. to about 10 cSt. up to about 50 cSt. to about 200 cSt. In a preferred embodiment employing polypropylene glycol the viscosity at 100° C. also usually ranges from about 5 cSt. to about 1,000 cSt. specifically, from about 10 cSt. to about 200 cSt.

Typical hydrocarbon lubricants contemplated include mineral oils such as those prepared from crude oils. These lubricating oils generally contemplated are acid refined lubricating oil distillates, solvent refined oils, hydrotreated oils, deasphalted oils, dewaxed oils including catalytically dewaxed oils, hydrocracked oils and oils formed by a combination of these refinery processes.

Synthetic hydrocarbons are also contemplated. Usually, useful synthetic hydrocarbons are produced by polymerization of olefins, condensation of olefins or chlorinated paraffins with aromatics and dechlorinating condensation of chlorinated paraffins. Typically, these synthetic hydrocarbon materials have a narrower boiling range and favorable low-temperature characteristics as compared to the mineral hydrocarbons. Polymerized alpha-olefins, which usually have favorable viscosity-temperature characteristics, include ethylene polymers, propylene polymers, polybutenes and polymeric higher olefins such as $C_5$ to $C_{20}$ olefins, specifically polydecenes.

A mixture of a mineral hydrocarbon oil and a synthetic polyalphaolefin may also be employed.

Usually when the hydrocarbon oil is a polyalphaolefin it will have a viscosity at 100° C. ranging from about 1.5 cSt. to about 5 cSt. to about 1,000 cSt., specifically, about 50 cSt. and when the hydrocarbon oil is a mineral oil it will have a viscosity at 100° C. ranging from about 3 cSt. to about 5 cSt. to about 50 cSt. up to about 100 cSt.

The following examples 1 and 2 facilitate a comparison between the performance of a conventional single phase lubricating system and the contemplated multi-phase lubricating system.

EXAMPLE 1

Figure 5:
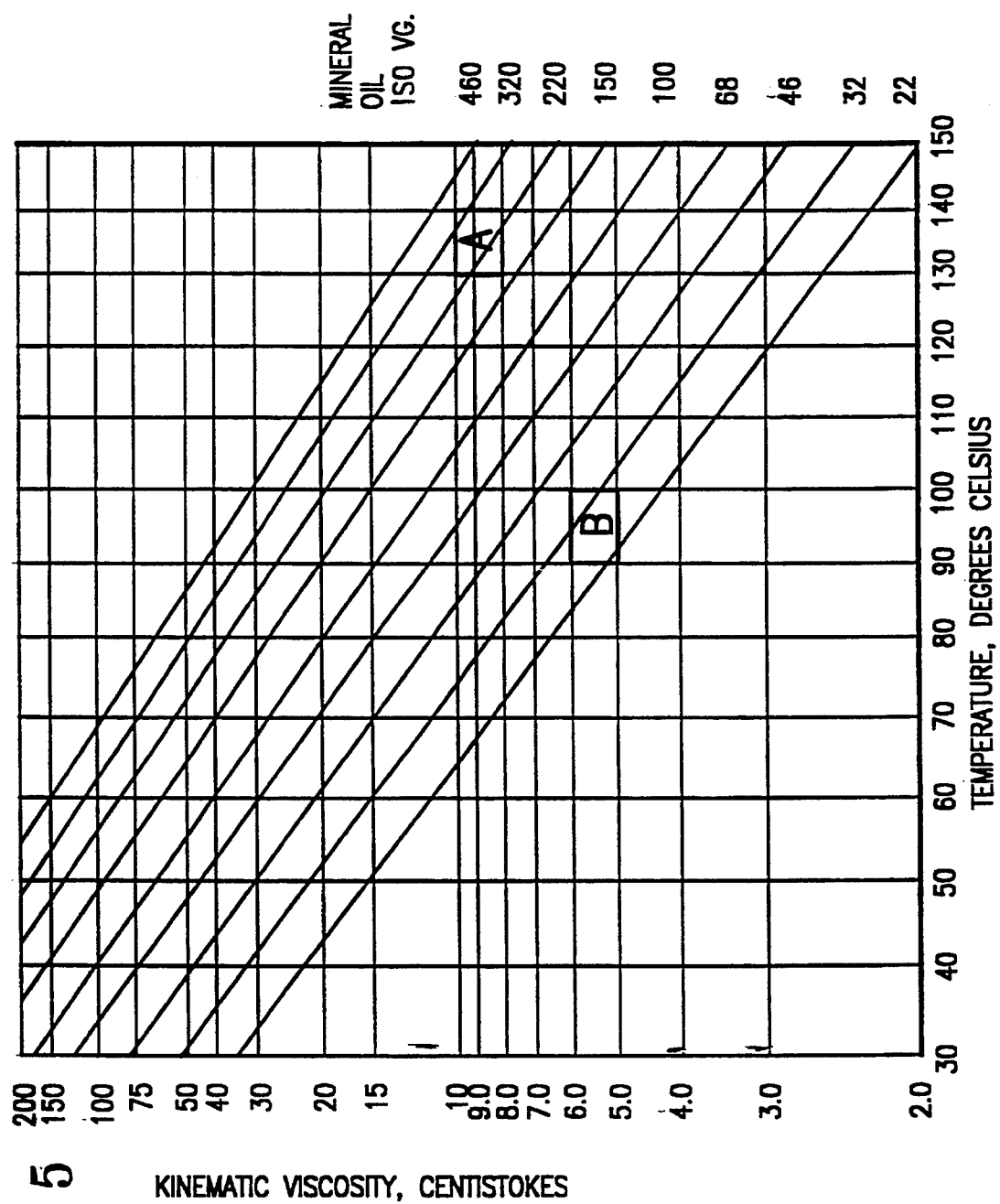
FIG. 5 is a viscosity-temperature plot for several single phase lubricants.

FIG. 5 is a viscosity-temperature plot, based on the data of Table 1, of several commercial general-purpose mineral oil-based lubricants having viscosities which range from ISO grade 22 to 680 (the ISO grade number equals the kinematic viscosity in centistokes at 40° C., and an oil falls in that grade if its viscosity at 40° C. is within ±10% of the grade number). These lubricants are blended from a small number of different basestocks and additives to form a single phase lubricant. The single phase lubricant is designed to maintain a single phase over long periods of time. As can be seen in FIG. 5, the variation in viscosity of a single grade of lubricant over a practical temperature range, such as a room temperature of 20° C. to a typical upper operating temperature limit in excess of 100° C. is very large.

The two areas labelled A and B on FIG. 5 represent an example of the needs of two hypothetical components in a machine, each component operating over a different temperature range and with different viscosity needs based on component geometry, speed and load. The lower and upper limits on the boxes cover the range of viscosity needed to satisfy operating conditions from high speed/low load (lower limit) to low speed/high load (upper limit). The side-to-side limits cover the range of operating temperatures for the machine. To optimize the needs of each component over all temperatures and operating conditions would take several viscosity grades of lubricant and to optimize the system for both components would take almost all of the grades. This is an important compromise which is likely to leave component A operating short of its viscosity target, and at increased risk of wear or failure, and component B operating with higher viscosity than it needs and therefore wasting energy.

TABLE 1

Viscosities for 95 VI
ISO Viscosity Grades 22–460

| ISO VG | KV 40° C. | KV 100° C. |
|---|---|---|
| 22 | 22 | 4.25 |
| 32 | 32 | 5.29 |
| 46 | 46 | 6.65 |
| 68 | 68 | 8.53 |
| 100 | 100 | 11.08 |
| 150 | 150 | 14.54 |
| 220 | 220 | 18.75 |
| 320 | 320 | 23.94 |
| 460 | 460 | 30.35 |

EXAMPLE 2

As shown in this Example, this invention allows the appropriate viscosity to be supplied to at least one component by selecting and mixing the correct proportion of two fluid phases, with the feature that the phases can be collected and easily separated into their component parts for reuse in the system.

Figure 6:
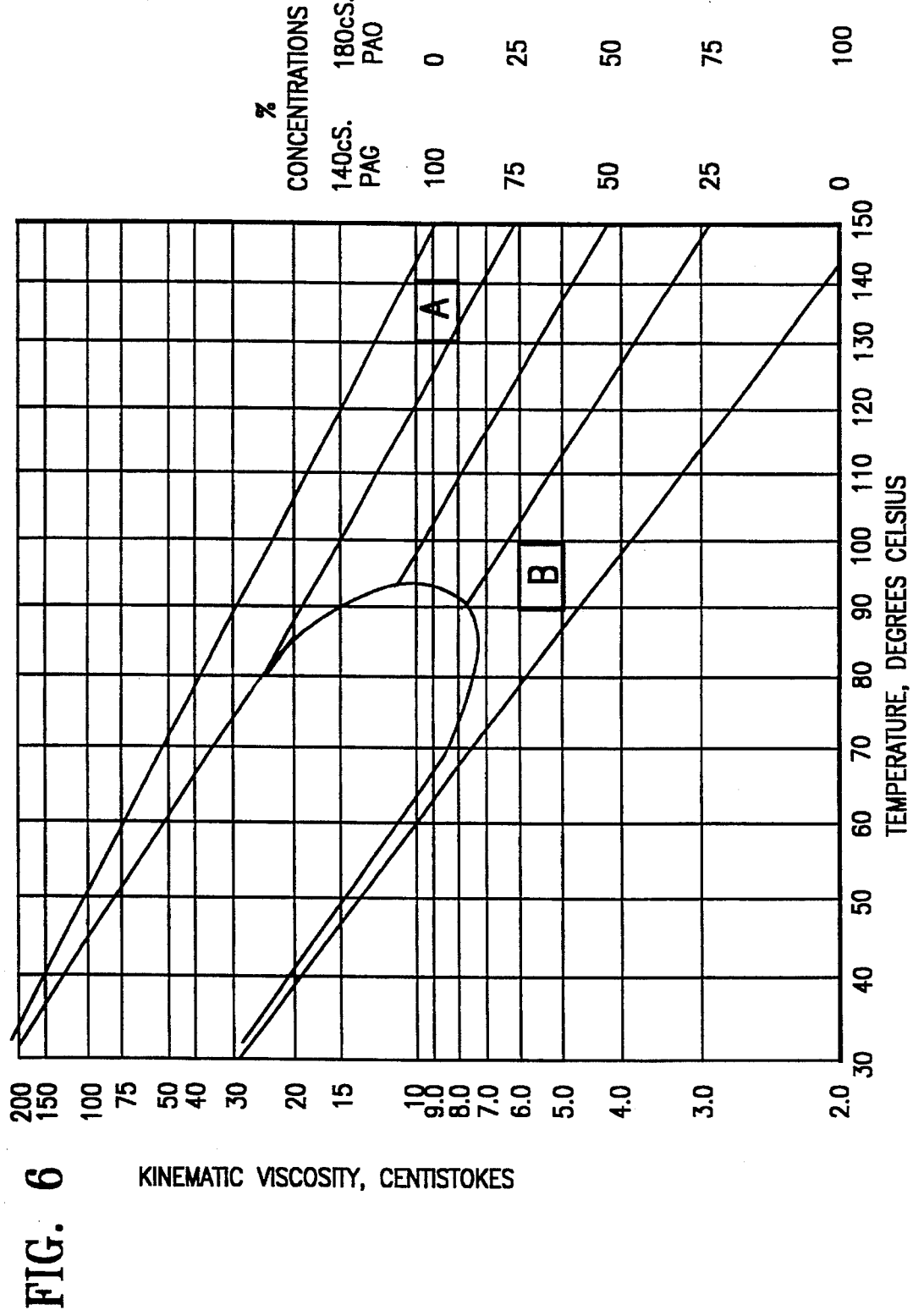
FIG. 6 is a viscosity-temperature plot of mixed lubricants containing two fluids in various proportions.

FIG. 6 is a viscosity-temperature plot for two fluids, a polyalkylene glycol and a hydrocarbon lubricant based on the data of Table 2. The upper and lower curves shown in FIG. 6 represent the viscosity-temperature profile of the two fluids and the area to the right of the roughly parabolic-shaped curve represents the region in which the two fluids would be completely miscible in any proportions. Box A and Box B for the two components, as discussed in relation to the conventional lubricants shown in FIG. 5, are also superimposed in FIG. 6. It can be seen from FIG. 6 that the appropriate viscosity lubricant will be achieved by supplying the proportions of each lubricant necessary to achieve that viscosity. For this purpose a supply system is employed to administer an appropriate proportion of each fluid depending upon the changes in the operating conditions of the operating component.

TABLE 2

Mobil SHF 41/PAG150 Mixture Viscosity Estimation

| Temp °C. | Mobil SHF 41 KV | PAG150 KV | Wt. fraction PAG150 | Mixture KV |
|---|---|---|---|---|
| 40 | 17.2 | 143 | | |
| 100 | 3.9 | 22.6 | 0 | 3.90 |
| 100 | 3.9 | 22.6 | 0.1 | 4.65 |
| 100 | 3.9 | 22.6 | 0.25 | 6.05 |
| 100 | 3.9 | 22.6 | 0.5 | 9.39 |
| 100 | 3.9 | 22.6 | 0.75 | 14.57 |
| 100 | 3.9 | 22.6 | 0.9 | 18.96 |
| 100 | 3.9 | 22.6 | 1 | 22.60 |
| 77 | 6.14 | 40.36 | 0.1 | 7.41 |
| 92 | 4.51 | 27.27 | 0.25 | 7.07 |
| 95 | 4.27 | 25.37 | 0.5 | 10.41 |
| 81 | 5.63 | 36.15 | 0.75 | 22.71 |
| 25 | 30.7 | 282 | 0.9 | 225.91 |
| 150 | 1.93 | 8.98 | 0 | 1.93 |
| 150 | 1.93 | 8.98 | 0.1 | 2.25 |
| 150 | 1.93 | 8.98 | 0.25 | 2.83 |
| 150 | 1.93 | 8.98 | 0.5 | 4.16 |
| 150 | 1.93 | 8.98 | 0.75 | 6.11 |
| 150 | 1.93 | 8.98 | 0.9 | 7.70 |
| 150 | 1.93 | 8.98 | 1 | 8.98 |

*log(KV, mix) = w1 × log(KV, 1) + w2 × log(KV, 2), where w represents the weight fraction, e.g. the weight fraction of 10% is 0.1.

EXAMPLE 3

The following Table 3 facilitates a comparison of the mixing temperatures, or transition temperatures, for various combinations of polyalkylene glycol lubricants and hydrocarbon lubricants. The transition temperatures were determined by visually observing the solid-liquid phase boundary behavior of the lubricants in a constant-temperature bath.

The test lubricants, in a known volumetric ratio were placed in a tube. The tube was placed in the constant-temperature bath and heated until a single-phase liquid was achieved. The temperature was lowered until the lubricants began to separate. The temperature was raised and lowered in increments. The transition temperature; that is, the temperature between separating and mixing of the phases at the two-phase/one-phase boundary, was observed and recorded until the transition temperature was repeatable to within 0.1° C.

Seven different combinations of lubricants were used at various ratios.

Lubricant 1: a polyalkylene glycol (PAG) oil known as Baylube 150GL (VI=187, kV@40° C.=143 cSt., kV@100° C.=22.6 cSt.) manufactured by Rhein Chemie and a synthetic polyalphaolefin hydrocarbon oil, Mobil SHF 61 (VI= 135, kV@ 40° C.=29.0 cSt.; kV@100° C.=5.6 cSt.)

Lubricant 2: the PAG oil of Lubricant 1 with a synthetic polyalphaolefin lubricant, Mobil SHF 41 (VI=119, kV @40° C.=17.25 cSt. and kV@100° C.=3.88 cSt).

Lubricant 3: The PAG oil of Lubricant 1 and a paraffinic mineral oil (kV@40° C.=51.6 cSt.; kV@100° C.=7.3 cSt.; VI=102).

Lubricant 4: a PAG oil P4000 (VI=233, kV@40° C.=408.5 cSt., kV@100° C.=64.7 cSt.) manufactured by DOW Chemical and the polyalphaolefin of Lubricant 1.

Lubricant 5: a 1:1 blend of PAG oils P4000, used in Lubricant 3, and P1200 (VI=160, kV@40° C. 82.4 cSt., kV@ 100° C.=13.1 cSt.), both manufactured by DOW Chemical, and the polyalphaolefin of Lubricant 1.

Lubricant 6: The PAG oil P1200 and Mobil SHF 61.

Lubricant 7: the PAG oil of Lubricant 6 and a synthetic polyalphaolefin stock, Mobil SHF 1001 (VI=168, kV@ 40° C.=1115.7 cSt., kV@100° C.=92.6 cSt.). In this example, the higher density fluid has a lower viscosity than the lower density fluid.)

TABLE 3

Transition Temperature (°C.) of Different Phase Lubricants

| Ratio PAG:HC | 1 | 2 | 3 | 4 | 5 | 6 | 7 |
|---|---|---|---|---|---|---|---|
| 0.01:99.99 | 40 | | | | | | |
| 0.10:99.90 | 100 | 77 | | | | | |
| 0.25:0.75 | | 92 | | 129 | 123 | 111 | |
| 0.50:0.50 | 115 | 95 | 95 | 130 | 123 | 114 | >150 |
| 0.75:0.25 | 115 | 81 | | 104 | 102 | 100 | >150 |
| 0.90:0.10 | | 25 | | | | | ~150 |

Comparing the transition temperatures shown in Table 3, it is evident that certain materials have lower transition temperatures than others and that the transition temperatures vary with the proportion of each component. Increasing disparity in molecular size also influences transition temperature. For example, the SHF 61/P4000 combination has a higher transition temperature than the SHF 61/P1200 combination. This is because the P4000 lubricant has a higher viscosity and molecular weight. The same is true for the higher molecular weight hydrocarbons. For instance, the 150GL/SHF 61 combination has a higher transition temperature than the 150GL/SHF 41 combination, the molecular weight of SHF 61 is greater than the molecular weight of SHF 41. The highest transition temperatures were required for the combination with the largest disparity in size. For example the SHF 1001/P1200 combination did not mix completely even at temperatures as high as 150° C. at the higher concentrations of PAG. At low concentrations of PAG (e.g. 0.9:.10) mixing was observed at ~150° C. On the other hand, comparing the performance of the paraffinic mineral oil with the polyalphaolefin Mobil SHF 61, it is noted that the paraffinic mineral oil mixed with the 150 GL at a lower temperature than the polyalphaolefin oil, Mobil SHF 61. This occurred even though the viscosity and average molecular weight of the mineral oil is higher than that of the Mobil SHF 61. The lower transition temperature required for the mineral oil was attributed to the greater variety of molecules in the mineral oil, particularly polar molecules which increase solubility in the more polar polyalkylene glycol. From this, it is expected that a cosolvent will enhance the mixing of one phase into another.

The interdependence of transition temperatures with the type and proportion of components can be exploited to control viscosity, and perhaps other properties of the single phase lubricant.

The tendency of the viscosity of the first phase lubricant (the low viscosity component) to decrease as the temperature increases will be, at least partially, counteracted by an increased concentration of the second phase lubricant (the high viscosity component) which mixes with the first phase lubricant as temperatures reach the mixing temperature. The increasing concentration of the second phase in the first phase increases the viscosity and the effective viscosity index of the first phase. Similarly, as the temperature falls below the mixing temperature the second phase separates from the first phase, lowering the viscosity of the first phase so that the lubricant will meet the lower temperature viscosity requirements. The multi-phase lubricant can be incorporated into a controlled mechanical system as herein described which enables an amount of each component to be combined at the mixing temperature to achieve a single phase lubricant of a certain viscosity which is then delivered to a machine element.

A blending component or cosolvent can be employed to help maintain a blend of the two phases. That is, the second phase can contain a material of similar density which facilitates mixing of the two phases. Examples of this include a second phase blend of mutually soluble polyglycol lubricants which have different molecular weights. The fluid which is more soluble in the first phase at a lower mixing temperature will facilitate mixing of both phases.

EXAMPLE 4

This Example shows the improved viscosity properties achieved in a multi-phase lubricant.

The viscosity properties of several hydrocarbon lubricant components used in the multi-phase blends of this example are reported in the following Table 4.

TABLE 4

Viscosity Properties of Hydrocarbon Lubricants

| Hydrocarbon lubricant | Density at 75° F. (g/cc) | Viscosity at 40° C. (cSt) | Viscosity at 100° C. (cSt) | Viscosity Index |
|---|---|---|---|---|
| Mobil SHF 41 | 0.81 | 17.25 | 3.88 | 119 |
| Mobil SHF 61 | 0.82 | 29.0 | 5.6 | 135 |
| Mobil SHF 1001 | 0.84 | 1115.7 | 92.6 | 168 |
| Paraffinic Mineral Oil | 0.87 | 51.6 | 7.3 | 102 |

The following Table 5 reports the viscosity properties of several polyglycol lubricant components used in the multi-phase blends of this example.

TABLE 5

Viscosity Properties of Polyglycol Lubricants

| Polyglycol | Density at 75° F. (g/cc) | Viscosity at 40° C. (cSt) | Viscosity at 100° C. (cSt) | Viscosity Index |
|---|---|---|---|---|
| Baylube 150GL | 1.00 | 143 | 22.6 | 187 |
| P1200 | 1.01 | 82.4 | 13.1 | 160 |
| P4000 | 1.01 | 408.5 | 64.7 | 233 |
| Blend of P1200 and P4000 | 1.01 | 183.5* | 29.1* | 200* |

*estimated value

The following Table 6 reports the viscosity properties of various combinations of the lubricants shown in Tables 4 and 5.

The viscosity of a single phase mixture of the two phases was determined by measuring the viscosity of the low viscosity first phase at a temperature at which the high viscosity second phase was mixed with the first phase. The viscosity measurement of the mixture was determined in accordance with the ASTM D445 test.

TABLE 6

Viscosity Properties of Multiphase Lubricant Mixtures

| Phase 1 Lubricant | Phase 2 Lubricant | Viscosity at 40° C. | Viscosity at 100° C. | Viscosity Index |
|---|---|---|---|---|
| Mobil SHF 41 | Baylube 150GL | 17.6 | 8.61 | 541 |
| Mobil SHF 61 | Baylube 150GL | 29.48 | 6.39 | 177 |
| Paraffinic Mineral Oil | Baylube 150GL | 53.87 | 12.84 | 247 |

From the results of Table 6, several important features of the invention are apparent. The effective viscosity index of the Mobil SHF 61/Baylube 150GL blend was 177. This translates to a viscosity index boost of 42 over the viscosity index of the Mobil SHF 61.

In a lubricant mixture of Mobil SHF 41 and Baylube 150GL the effective VI was 541. The relatively low mixing temperature of 95° C., as shown in Table 6, indicates that the viscosity properties of the first phase could be easily varied at relatively low temperatures by changing the proportion of the second phase in the mixture.

A VI increase for the mixture of the paraffinic/mineral oil and Baylube 150GL is also shown in Table 6. The VI boost was lower than that achieved with the Baylube 150GL/Mobil SHF 41 mixture because the disparity in viscosity is not as large.

What is claimed is:

1. An apparatus for lubricating an operating component of a system in which the operating component is exposed to a variation in a condition of operation which is benefitted by adjusting at least one physical property of the lubricant which lubricates the component during operation, comprising:

(a) a reservoir comprising a first lubricant of low density and low viscosity and a second lubricant of higher density and higher viscosity than the first lubricant, the second lubricant is at least partially immiscible with the first lubricant under an operating condition suitable for at least partial immiscibility;

(b) a third lubricant comprising at least a partial mixture of the first lubricant and the second lubricant which partial mixture forms within the reservoir under an operating condition suitable for at least partial miscibility of the first lubricant and the second lubricant;

(c) an operating component, at least a portion of the operating component being located within the reservoir, under a condition of immiscibility, and the operating component being in contact with the third lubricant under an operating condition suitable for at least partial miscibility of the first lubricant and the second lubricant, the operating component further being in contact with the first lubricant under an operating condition suitable for immiscibility, the contact of the operating component with the first and the third lubricants occurring without discontinuing system operation.

2. The apparatus of claim 1 in which the first lubricant is a hydrocarbon oil and the second lubricant is a polyalkylene glycol.

3. The apparatus of claim 2 in which the polyalkylene glycol is polypropylene glycol.

4. The apparatus of claim 2 in which the hydrocarbon oil is a synthetic polyalphaolefin.

5. The apparatus of claim 4 in which the hydrocarbon oil is a polydecene.

6. The apparatus of claim 1 in which the first lubricant is a polyalkylene glycol and the second lubricant is a hydrocarbon.

7. The apparatus of claim 6 in which the second lubricant is a synthetic polyalphaolefin.

8. The apparatus of claim 6 in which the first lubricant is a polypropylene glycol.

9. The apparatus of claim 6 in which the second lubricant is a mineral oil.

10. The apparatus of claim 6 in which the hydrocarbon is polydecene.

11. The apparatus of claim 1 in which the operating component is a gear or a bearing.

12. A process for lubricating an operating component of a system in which the operating component is exposed to a variation in a condition of operation during System operation, comprising:

(a) maintaining a first lubricant of low density and low viscosity and a second lubricant of higher density and higher viscosity than the first lubricant in a lubricant zone under an operating condition in which the first lubricant and the second lubricant are at least partially immiscible;

(b) contacting the operating component with the first lubricant under the operating condition of immiscibility;

(c) conducting the contacting of the operating component under an operating condition which is different from the operating condition of step (b) and which operating condition causes at least partial miscibility of the first lubricant and the second lubricant to form a third lubricant which has at least one property which is different from that property of the first lubricant and the second lubricant;

(d) contacting the operating component with the third lubricant, the third lubricant being more appropriate for lubricating the operating component under the different operating condition than the first lubricant or the second lubricant and (e) returning the third lubricant to step (a) and repeating steps (b)–(d) without discontinuing system operation.

13. The process of claim 12 in which the first lubricant is a hydrocarbon oil and the second lubricant is a polyalkylene glycol.

14. The process of claim 13 in which the polyalkylene glycol is polypropylene glycol.

15. The process of claim 13 in which the hydrocarbon oil is a synthetic polyalphaolefin.

16. The process of claim 15 in which the hydrocarbon oil is a polydecene.

17. The process of claim 12 in which the first lubricant is a polyalkylene glycol and the second lubricant is a hydrocarbon.

18. The process of claim 17 in which the second lubricant is a synthetic polyalphaolefin.

19. The process of claim 17 in which the first lubricant is a polypropylene glycol.

20. The process of claim 17 in which the second lubricant is a mineral oil.

21. The process of claim 17 in which the hydrocarbon is polydecene.

22. The process of claim 12 in which the operating component is a gear or a bearing.

23. The process of claim 12 which further comprises the step of (e) returning the third lubricant to the lubricant zone of step (a).

* * * * *